US012732475B2

(12) United States Patent
Nackenhorst et al.

(10) Patent No.: US 12,732,475 B2
(45) Date of Patent: Sep. 8, 2026

(54) PROFESSIONAL TRAINING AND EVALUATION SYSTEM

(71) Applicant: GAIA AG, Hamburg (DE)

(72) Inventors: Olaf Nackenhorst, Dortmund (DE); Bernhard Wellhöfer, Hamburg (DE); Mario Weiss, Hamburg (DE)

(73) Assignee: GAIA AG, Hamburg (DE)

( * ) Notice: Subject to any disclaimer, the term of this patent is extended or adjusted under 35 U.S.C. 154(b) by 38 days.

(21) Appl. No.: 19/046,336

(22) Filed: Feb. 5, 2025

(65) Prior Publication Data

US 2026/0156095 A1 Jun. 4, 2026

Related U.S. Application Data

(60) Provisional application No. 63/727,408, filed on Dec. 3, 2024.

(51) Int. Cl.
*H04L 51/216* (2022.01)
*G06Q 10/0637* (2023.01)

(52) U.S. Cl.
CPC ....... *H04L 51/216* (2022.05); *G06Q 10/0637* (2013.01)

(58) Field of Classification Search
CPC .......................... H04L 51/216; G06Q 10/0637
See application file for complete search history.

(56) References Cited

U.S. PATENT DOCUMENTS

2020/0151620 A1* 5/2020 Chao ...................... G06N 3/084
2021/0368039 A1* 11/2021 Voss .................. H04M 1/72439
2022/0115133 A1 4/2022 Mason et al.
2022/0385603 A1* 12/2022 Aher ..................... H04L 51/063
(Continued)

FOREIGN PATENT DOCUMENTS

CN 108780663 B 12/2022
CN 109243605 B 12/2022

OTHER PUBLICATIONS

Chul Ko, Byoung; “A Brief Review of Facial Emotion Recognition Based on Visual Information”; MDPI, Sensors; Jan. 30, 2018; 20 Pages.

(Continued)

*Primary Examiner* — Gil H. Lee
(74) *Attorney, Agent, or Firm* — Whitmyer IP Group LLC

(57) ABSTRACT

A professional services training companion system has a character trait database having a plurality of human character traits; a message database having a plurality of customer interaction message histories; a summary database having an emotional summary of each of a plurality of customers' interaction sessions; a computer with access to at least the character trait database and the message database and with a communication to a trainee; composer software executing on the computer for retrieving a message history and character traits for a test customer and formulating a proposed new message to send to the trainee; inner voice software executing on the computer for retrieving an emotional summary for the test customer's interaction session and for analyzing the proposed new message in view of the emotional summary to generate a revised message; and transmitting the revised message to the trainee using the communication link.

15 Claims, 2 Drawing Sheets

(56) References Cited

U.S. PATENT DOCUMENTS

2024/0129408 A1* 4/2024 Rolinson ........ G06Q 10/063112
2025/0150422 A1* 5/2025 Allen, Jr. ................ H04L 51/04

OTHER PUBLICATIONS

Mehta, Dhwani, et al; "Facial Emotion Recognition: A Survey and Real-World User Experiences in Mixed Reality"; MDPI, Sensors—Wearable Smart Devices, vol. 18, Issue 2; Basel, Switzerland; Feb. 1, 2018; 24 Pages.
Abd-Alrazaq, Alaa A., et al.; "An overview of the features of chatbots in mental health: A scoping review"; International Journal of Medical Informatics; vol. 132; Science Direct, Elsevier; Dec. 2019; 8 Pages.
Brown, Tom B., et al.; "Language Models are Few-Shot Learners"; ArXiv, Computer Science—Computation and Language, Cornell University; Jul. 22, 2020; 75 Pages.
Dalvi, Chirag, et al.; "A Survey of AI-Based Facial Emotion Recognition: Features, ML & DL Techniques, Age-Wise Datasets and Future Directions"; IEEE, vol. 9; Nov. 30, 2021; 35 Pages.
Tanana, Michael J., et al.; "How do you feel? Using Natural language processing to automatically rate emotion in psychotherapy"; Behavior Research Methods; Springer; Mar. 22, 2021; 21 Pages.
Piccoli, Benedetto; "Control of multi-agent systems: results, open problems, and applications"; ArXiv, Mathematics—Optimization and Control, Cornelle University; Feb. 2023; 41 Pages.
Tauscher, Justin S., et al.; "Automated Detection of Cognitive Distortions in Text Exchanges Between Clinicians and People With Serious Mental Illness"; American Psychiatric Association, Psychiatric Services, vol. 74, No. 4; Apr. 1, 2023; 4 Pages.
Casu, Mirko, et al.; "AI Chatbots for Mental Health: A Scoping Review of Effectiveness, Feasibility, and Applications"; MDPI, Applied Sciences, vol. 14, Issue 13, Innovative Digital Health Technologies and Their Applications; Basel, Switzerland; Jul. 5, 2024; 23 Pages.
Du, Zhuoyun, et al.; "Multi-Agent Software Development through Cross-Team Collaboration"; ArXiv, Computer Science—Computation and Language, Cornell University; Jun. 13, 2024; 17 Pages.
Guo, Taicheng, et al.; "Large Language Model based Multi-Agents: A Survey of Progress and Challenges"; ArXiv, Computer Science—Computation and Language, Cornell University; Apr. 19, 2024; 15 Pages.
Held, Philip, et al.; "A Novel Cognitive Behavioral TherapyBased Generative AI Tool (Socrates 2.0) to Facilitate Socratic Dialogue: Protocol for a Mixed Methods Feasibility Study"; JMIR Research Protocols, vol. 13; Oct. 13, 2024; 15 Pages.
Jiang, Meng, et al.; "A Generic Review of Integrating Artificial Intelligence in Cognitive Behavioral Therapy"; Aug. 5, 2024; 43 Pages.
Jiang, Meng; "AI-Enhanced Cognitive Behavioral Therapy: Deep Learning and Large Language Models for Extracting Cognitive Pathways from Social Media Texts"; ArXiv, Computer Science—Computation and Language, Cornell University; Apr. 17, 2024; 29 Pages.
Kampman, Onno P., et al.; "A Multi-Agent Dual Dialogue System to Support Mental Health Care Providers"; ArXiv, Computer Science—Human-Computer Interaction, Cornell University; Nov. 28, 2024; 16 Pages.
Li, Ao, et al.; "Agent-Oriented Planning in Multi-Agent Systems"; ArXiv, Computer Science—Artificial Intelligence, Cornell University; Oct. 3, 2024; 20 Pages.
Naveed, Humza, et al.; "A Comprehensive Overview of Large Language Models"; ArXiv, Computer Science—Computation and Language Cornell University; Feb. 28, 2024; 90 Pages.
Wang, Ruiyi, et al.; "Patient-?: Using Large Language Models to Simulate Patients for Training Mental Health Professionals"; ArXiv, Computer Science—Computation and Language, Cornell University; Oct. 3, 2024; 26 Pages.

* cited by examiner

PROFESSIONAL TRAINING AND EVALUATION SYSTEM

TECHNICAL FIELD

The present disclosure relates to computers that are configured to provide interactive dialog experiences, and more particularly, to improvements in the algorithms that professional services training companions use to provide such experiences.

BACKGROUND

Presently, generative artificial intelligence systems ("GenAI") are prevalent. Such systems use statistical guessing to produce a most likely correct response to a prompt.

An example of a results-sensitive task is the training of professionals, including training a new hire or existing employee in interactions with customers or clients of the employer.

Training of professional practitioners generally involves a trainee shadowing an experienced practitioner during treatment of an actual customer. But with the expanding demand for employment training, not enough experienced practitioners are available for trainees to get their hours. Further complications arise where the employer has a very demanding customer base (e.g., the sale of luxury goods) where the customer will not tolerate an inexperienced services provider, or where the employer has a very high-volume customer base where the ability to provide supervision is limited or non-existent. This presents a chicken/egg problem where the pool of practitioners cannot be expanded fast enough because the pool of practitioners is not big enough. It would be desirable to have a way for a trainee to practice their craft without needing an experienced practitioner to supervise the trainee working with a real customer.

Computerized training systems are known, including systems for providing professional services training companions, but these systems are only "intelligent" in the sense that they have the ability to answer a limited number of questions or provide a limited amount of information. Additionally, such systems have been only text-based. They either cannot accept inputs other than text, or they only provide replies in text, or both. So, the efficacy of existing computerized professional services training systems is limited at least because the full range of a trainees' observations and experience cannot be used for training through simulation of a customer interaction.

Further, current generation computerized training systems, including systems which may be operated as "professional services training companions," have trouble with logic and reasoning because they are fundamentally statistical guessing machines that produce the most "likely" response to a prompt. When handling signals of intense emotional valence rather than spelling words, the potential for over-simplification by an unsupervised computerized training system could be counter-productive or even dangerous.

SUMMARY

According to aspects of the present disclosure, a professional services training companion is provided that includes: a character trait database having a plurality of human character traits; a message database having a plurality of customer interaction message histories; a computer with access to the character trait database and the message database, said computer having a communication link between said computer and a trainee; software executing on the computer for retrieving a message history and character trait for a test customer and formulating a proposed new message to send to the trainee; a summary database having an emotional summary of each of a plurality of customer's interaction sessions; software executing on the computer for retrieving an emotional summary for the test customer's interaction session and for analyzing the proposed new message in view of the message history to generate a revised message; and transmitting the revised message to the trainee using the communication link.

Thus, aspects of the present disclosure can provide a professional services training companion that is available 24/7 for use by trainees. The system can be realized through a mobile text interface, for example, by texting a given number. Given the capabilities of speech-to-text and text-to-speech, as well as the ability for speaking video generation from 2-D still images and text, voice and video interfaces also are contemplated.

A professional services training companion according to the present teachings can be implemented by a wide range of professionals, including but not limited to those in the medical, legal, accounting, architectural, and engineering fields.

Such a professional services training companion can provide trainees timely and consistent support, regardless of time or location. By using advanced agent-based systems to deliver personalized responses, the training companion can focus on the individualized needs of trainees, enhancing the accessibility and effectiveness of support.

Embodiments of a professional services training companion according to the present disclosure are not limited to a specific mode of communication. Such a training companion can support various communication platforms, such as a proprietary web app, WhatsApp, SMS (Simple Message Service), RCS (Rich Communication Services), iMessages, Signal, FaceTime or other text, voice, and/or video modalities. Thus, a professional services training companion according to aspects of the present disclosure may allow trainees to choose their preferred communication method. Speech-to-text, text-to-speech, and text-to-video technologies enable consistent and seamless interaction across different platforms and enhance accessibility by catering to diverse user preferences and needs. The disclosed training companion delivers a cohesive user experience regardless of the communication channel used.

A multi-agent approach is a key aspect of the present disclosure. In the professional services training companion interaction, each reply is computed not in a single step but through a complex interplay of multiple agents. These agents distribute intermediate "cognitive" steps across multiple specialized requests to generate a supportive reply. Each agent is specialized in handling specific aspects of the reply-generation task, contributing to a more accurate and efficient overall response. The system can adapt to different support scenarios by reconfiguring the agents and their interactions. By distributing tasks among multiple agents, the system enhances resilience and fault tolerance, reducing the impact of any single point of failure. Specialized agents improve the likelihood that each aspect of the support algorithm is addressed with the highest level of expertise, improving the overall accuracy and effectiveness.

Key agents include a memory, an inner voice, and a composer.

The memory is configured to generate a narrative from a series of messages and replies. Thus, the memory forms a summary of the case or conversation between the training companion and the trainee. Overall, the memory provides a long-term memory representation of the training companion's interaction with the trainee. As part of the long-term memory representation, the memory compresses the information from the messages and replies into a compact vector (a mathematical representation of the narrative) that can be fed to the composer. The compressed information enables maintenance of continuity in the conversation by keeping track of the trainee's history, attributes, progress. The memory's representation of the interaction also enables provision of insight into the interaction. The memory operates in parallel to the other agents, so that its algorithm does not drive latency in the conversation.

The composer is configured to represent the cognitive process of a professional's client, e.g., a client of a professional services provider. As such, the composer combines all available trainee information (including the memory's representation of such information) with relevant character traits to provide a client's assessment of the interaction and the trainee's interactions. Based on the client's assessment, the composer proposes relevant responses and/or questions that could be posed to the trainee. The composer thereby plans a further course of action in the conversation. The composer operates independently of the memory and inner voice, working in parallel rather than sequentially. Once the composer formulates a new assessment, the assessment is stored in a history of the interaction for access and use by the composer. The composer, by operating in parallel to the other agents to plan the course of the conversation, enhances response speed from the trainee's perspective by preparing assessments ahead of time. Unlike a human conversation, the professional services training companion is fully capable of both receiving a message and planning a response in parallel. Thus, the composer enables enhanced or superior active listening.

The inner voice provides critical assessment and revision of a proposed reply to the trainee's message, based on all available information about the trainee including the message itself, the inner voice's assessment and the memory's representation of the interaction with the trainee. Thus, the inner voice utilizes information partially prepared by other agents. The inner voice tailors each revised reply to the specific needs and context of the trainee. The inner voice maintains consistency in the conversation by harmonizing data from the other agents.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings.

BRIEF DESCRIPTION OF THE DRAWINGS

The present teachings are described more fully hereafter with reference to the accompanying drawings, which depict example embodiments. The following description illustrates the present teachings by way of example, not by way of limitation of the principles of the present teachings.

It should be understood that throughout the drawings the corresponding reference numerals indicate like or corresponding parts and features.

DETAILED DESCRIPTION

For purposes of explanation and not limitation, specific details are set forth such as particular structures, architectures, interfaces, techniques, etc. in order to provide a thorough understanding. In other instances, detailed descriptions of well-known devices and/or methods are omitted so as not to obscure the description with unnecessary detail.

Figure 1:
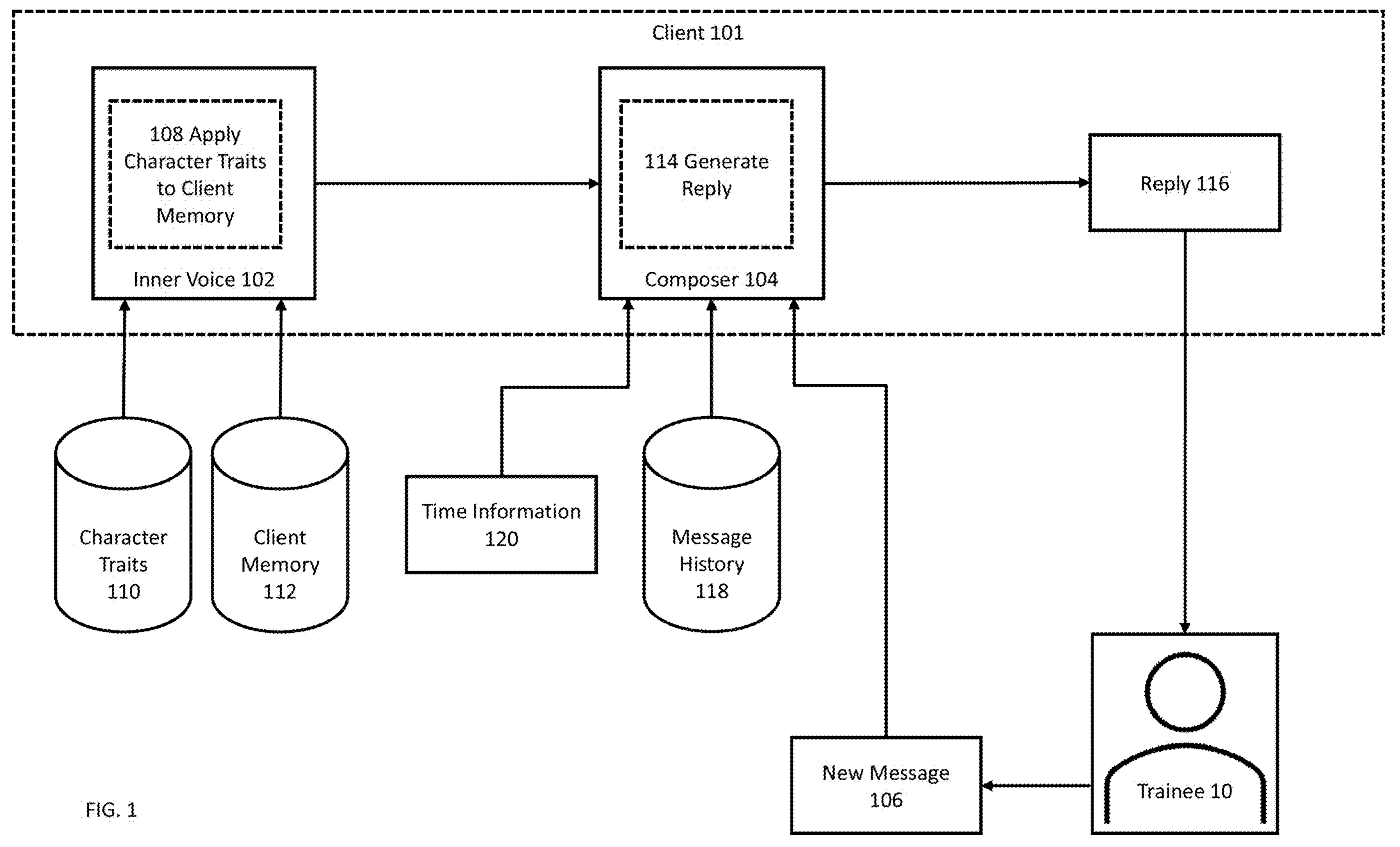
FIG. 1 depicts one embodiment of an overall interaction 100 of a professional services training companion 101 with a trainee 10, consistent with selected aspects of the disclosure.

FIG. 1 depicts an overall interaction 100 of a professional services training companion (also referred to as a "customer" or a "client") 101 with a professional services trainee 10, consistent with selected aspects of the disclosure.

The professional services training companion (or client) 101 includes a composer 102, an inner voice 104, and a summarizer (or memory) 102. The client receives a new message 106 from a professional services trainee and produces a reply 116.

First the client 101 formulates the inner voice 102 by applying 108 character traits 110 to a client memory 112. For example, the inner voice 102 uses the character traits 110 as a context portion of a complex LLM prompt and uses the client memory 112 as a situation portion of the complex LLM prompt where the task is to produce the inner voice 102: ("You are a person who [character traits=context] and you have had the following conversations: [=situation]. Tell me what you are thinking [=task]."). For example, the set of character traits 110 may be in the form of a complex (many token, e.g., thousands of tokens) prompt. Alternatively, the character traits 110 may be encoded in the weights of a neural network in the client 101.

In some embodiments, the composer 102 takes a compilation of the trainee and/or customer replies 118 and the character traits 110 as a prompt. The composer weights may be trained on a set of situational data, questions, and suggestions.

The inner voice 104 is configured to generate 122 a critical analysis of the message 120, based at least on the emotional summary 182. The critical analysis may be in the form of a multi-dimensional vector that critiques the congruence of the message 120 with the emotional summary 182. The inner voice 104 applies the critical analysis 122 to the message 120 in order to draft 124 the revised message 172.

The character traits 184 may be updated in response to the critical analysis 122, in a manner to be further described with reference to FIG. 1. First the professional services training companion 101 retrieves (as an input) a detailed character description of the client and formal constraints (e.g., character traits 110), retrieves the memory of the client 112, and retrieves the inner voice 102. The customer's inner voice 102 is formulated by applying 108 character traits 110 to a customer memory 112. For example, the inner voice 102 uses the character traits 110 as a context portion of a complex LLM prompt and uses the customer memory 112 as a situation portion of the complex LLM prompt where the task is to produce the inner voice 102: ("You are a person who [character traits=context] and you have had the following conversations: [=situation]. Tell me what you are thinking [=task]."). For example, the set of character traits 110 may be in the form of a complex (many token, e.g., thousands of tokens) prompt. Alternatively, the character traits 110 may be encoded in the weights of a neural network in the customer as created by the professional services training companion 101.

Next, the composer 104 generates 114 the reply 116, based at least on the inner voice 102, the new message 106, a history of messages 118, and time information 120. The composer 104 applies the inner voice 102 to the new message 106 in order to generate the reply 116. For example, the composer 104 may use the inner voice 102 as a context portion of a complex LLM prompt and may use the new message 106 as a situation portion of the complex LLM prompt where the task is to produce the reply 116: ("You are thinking [inner voice 102=context] and the professional services provider, e.g., trainee, says [new message 106=situation]. What do you say next? [=task]").

Figure 2:
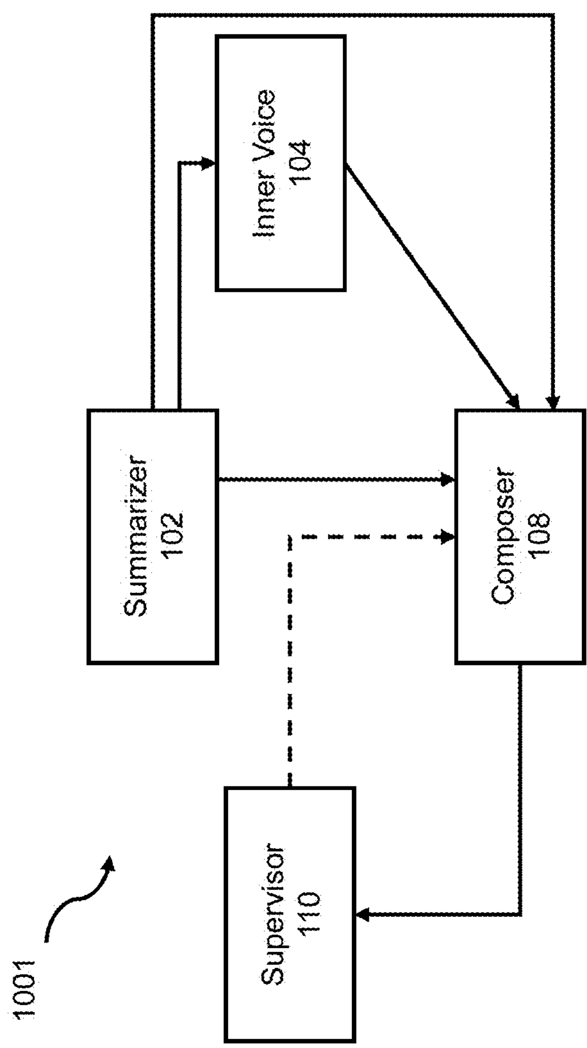
FIG. 2 depicts a high-level interaction of one embodiment of a computerized training system comprised of a supervisor, summarizer, inner voice, and composer.

At each iteration of new message 106 and reply 116, the system 101 stores these communications in the customer memory 112. FIG. 2 depicts how the system 101 stores communications in the memory 112. The memory 112 consists of short-term memory in the form of recent or last-used messages, and consists of long-term memory in the form of an evolving summarized memory log from the perspective of the client (including factual progress, key memories, emotional evolution, and cognitive changes). The inner voice 102 describes the current emotional and cognitive state of the client in the form of an inner monologue. The inner voice 102 and long-term portion of the memory 112 thus serve as a representation of the inner state of the client 101 and allow for evolution of the client during the training process.

At each iteration of customer and/or trainee reply 112 and revised message 172, the professional services training companion 101 stores these communications in the message history 180.

A prompt may be provided for the composer of the professional services training companion 101. Purposes of the composer include creating a customer's inner monologue; emulating cognition of the customer; expressing struggle, thoughts, and feelings; maintaining character consistency across messages 120; maintaining continuity of the conversation; and keeping aware of time. The prompts include the character traits 184, the memory 182, the last ten messages, the last composer, instructions and constraints, and a current time. Each iteration of the composer updates the previous composer.

Inputs to a prompt for the inner voice 104 of the professional services training companion 101 are described as follows. The purpose of the inner voice is to produce a "realistic" revised message 172 as a customer's answer to the trainee reply 112. Instructions and constraints for the inner voice include language and style; structure and content; contextual awareness; interaction dynamics; and behavioral realism. Accordingly, the inner voice 104 incorporates the character traits 184, the memory 182, the last ten messages, the composer 102, the aforementioned instructions and constraints, a time since the last message, a current time, and the most recent trainee reply 112.

FIG. 2 depicts a narrow view of the operation of the professional services training companion 101.

A prototype of the professional services training companion operates on multiple instances of GPT-4 by OpenAI. Open-source models such as LLaMA 3 are equally suitable. The training companion may be self-hosted. Using multiple instances of large language models (LLMs) that take separate customized prompts and/or are trained on custom data enables the training companion 101 to produce high-quality responses. LLMs can provide powerful capabilities for processing and generating human-like text. Moving to open-source models may enhance scalability and provide greater control over the system. For example, using a self-hosted open-source model may allow for customization and fine-tuning to meet specific support needs. Additionally, self-hosting ensures higher security and better privacy for user data. As an alternative or supplement to fine-tuning with data, embodiments of the training companion may utilize advanced prompt engineering (for example, based on a database of curated prompts) for effective responses. The trainee may receive feedback from an evaluation system (such as the current emotional state of the client), rating single response messages based on certain categories and tracking long-term development of the conversation. This feedback (in the form of performance measures) can be used by the trainee to improve the responses, which in turn receive further ratings until a threshold is met where the trainee is considered "successfully trained" in the professional services role.

The present teachings have been described in language more or less specific as to structural, mechanical, and functional features. It is to be understood, however, that the present teachings are not limited to the specific features shown and described, since the apparatus, system, and/or method herein disclosed comprises preferred forms of putting the present teachings into effect.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The use of "first", "second," etc. for different features/components of the present disclosure are only intended to distinguish the features/components from other similar features/components and not to impart any order or hierarchy to the features/components, unless explicitly stated otherwise. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C.

Other than in the operating examples, or where otherwise indicated, all numbers expressing quantities of ingredients or reaction conditions used herein are to be understood as modified in all instances by the term "about".

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. For example, in some instances, one or more features disclosed in connection with one embodiment can be used alone or in combination with one or more features of one or more other embodiments. It is intended that the scope of the present teachings should be determined by proper interpretation and construction of any claims and their legal equivalents, as understood by those of skill in the art relying upon the disclosure in this specification and the attached drawings.

What is claimed is:

1. A professional services training companion system comprising:

a character trait database having a plurality of human character traits;

a message database having a plurality of customer interaction message histories;

a summary database having an emotional summary of each of a plurality of customer interaction sessions;

a computer with access to at least the character trait database and the message database, said computer having a communication link between said computer and a trainee;

composer software executing on the computer for retrieving a message history and character traits for a test customer and formulating a proposed new message to send to the trainee;

inner voice software executing on the computer for retrieving an emotional summary for the test customer's interaction session and for analyzing the proposed new message in view of the emotional summary to generate a revised message; and transmitting the revised message to the trainee using the communication link.

2. The system of claim 1, wherein the composer software incorporates the character traits, the emotional summary, and the last ten messages.

3. The system of claim 1, wherein the inner voice software incorporates instructions and constraints related to at least one of language and style; structure and content; contextual awareness; interaction dynamics; and behavioral realism.

4. The system of claim 1, wherein each message history is a series of messages and replies, further comprising a memory that is configured to generate a narrative from a message history.

5. The system of claim 4, wherein the memory compresses the narrative into a compact mathematical representation.

6. The system of claim 4, wherein the composer software uses the narrative to maintain continuity of communication.

7. The system of claim 4, wherein the inner voice software uses the narrative to provide insight into the interaction.

8. The system of claim 4, wherein the composer generates an assessment of the interaction and the trainee by analyzing the narrative in combination with character traits.

9. The system of claim 4, wherein the memory incorporates instructions for tracking trainee experience.

10. The system of claim 4, wherein the memory incorporates instructions for tracking customer progress.

11. The system of claim 4, wherein the memory incorporates instructions for tracking goals and/or tasks.

12. The system of claim 11, wherein the composer generates a message based on the memory tracking a goal or task as not completed.

13. The system of claim 4, wherein the memory incorporates instructions for identifying information gaps.

14. The system of claim 13, wherein the composer generates a message based on the memory identifying an information gap.

15. A non-transitory computer readable medium that is encoded with instructions, which, when executed by a computer, implement a system comprising:

a character trait database having a plurality of human character traits; a message database having a plurality of customer interaction message histories;

a summary database having an emotional summary of each of a plurality of customer's interaction sessions;

said computer accessing at least the character trait database and the message database, said computer having a communication link between said computer and a trainee;

composer software executing on the computer for retrieving a message history and character traits for a test customer and formulating a proposed new message to send to the trainee;

inner voice software executing on the computer for retrieving an emotional summary for the test customer's interaction session and for analyzing the proposed new message in view of the emotional summary to generate a revised message; and transmitting the revised message to the trainee using the communication link.

* * * * *